United States Patent [19]
Festl et al.

[11] Patent Number: 5,699,358
[45] Date of Patent: Dec. 16, 1997

[54] METHOD FOR TRAFFIC ROUTING IN A COMMUNICATIONS NETWORK

[75] Inventors: Robert Festl, Munich; Matthias Nindel, Rosenheim, both of Germany

[73] Assignee: Siemens Aktiengesellschaft, Munich, Germany

[21] Appl. No.: 527,709

[22] Filed: Sep. 13, 1995

[30] Foreign Application Priority Data

Sep. 13, 1994 [EP] European Pat. Off. ............ 94114392

[51] Int. Cl.$^6$ ................................. H04Q 11/00
[52] U.S. Cl. ................................ 370/351; 370/406
[58] Field of Search ........................ 370/54, 16, 17, 370/60, 60.1, 94.1, 94.2, 94.3, 351, 217, 221, 225, 222, 252, 352, 422, 389, 394, 406; 455/33.1, 33.4, 54.1, 56.1

[56] References Cited

U.S. PATENT DOCUMENTS

| | | | |
|---|---|---|---|
| 5,115,495 | 5/1992 | Tsuchiya et al. | 370/94.1 |
| 5,128,926 | 7/1992 | Perlman et al. | 370/54 |
| 5,410,752 | 4/1995 | Scholefield | 455/33.1 |
| 5,488,608 | 1/1996 | Flammer, III | 370/94.3 |
| 5,537,394 | 7/1996 | Abe et al. | 370/54 |

FOREIGN PATENT DOCUMENTS 0 376 556 A2  4/1990  European Pat. Off. ......... H04Q 3/00

OTHER PUBLICATIONS

A Stimulation Study of Advanced Routing Methods in a Multipriority Telephone Network, 8278 IEEE Transactions on Systems, Man and Cybernetics SMC-15 (1985) Nov., -Dec.,No. 6, NY USA.

Primary Examiner—Douglas W. Olms
Assistant Examiner—Shick Hom
Attorney, Agent, or Firm—Hill, Steadman & Simpson

[57] ABSTRACT

In order to determine the second path in the case of non-availability of a direct path between neighboring switching nodes, there are held in the individual switching nodes priority lists in which, ordered in terms of the degree of loading, the direct paths to the neighboring nodes and the direct paths from these neighboring nodes to the neighboring nodes thereof are identified by comparing the priority list of the originating node with that of the neighboring destination node, that neighboring node whose direct paths to the originating and destination nodes promise the highest switching probability being selected as an intermediate switching node of a second path.

8 Claims, 3 Drawing Sheets

METHOD FOR TRAFFIC ROUTING IN A COMMUNICATIONS NETWORK

BACKGROUND OF THE INVENTION

The invention relates to a method for traffic routing in a communications network having a plurality of switching nodes intermeshed such that a connection can be established between two neighboring switching nodes via a plurality of connecting paths.

In a communications network of the relevant type, a plurality of switching nodes are intermeshed in such a way that a connection can be established between two switching nodes via a plurality of connecting paths.

In the case of traffic routing in such a communications network, the point is to determine a second path leading via an intermediate switching node whenever a direct path is not available between an originating switching node and a neighboring destination switching node.

In a known method (EP 0 376 556 A3), there are present for this purpose in the switching nodes data relating to the achievability of the direct paths forming connections with the respective neighboring nodes. In the case of an establishment of a connection, in accordance with this method the originating switching node requests in each case from the destination switching node a corresponding data record relating to the direct paths connecting this destination switching node to its neighboring nodes. On the basis of these data, which apart from specifying the availability of a direct path also contain details on the usage factor of the direct paths, a second path which is loaded to the least extent is then selected in the originating switching node.

Such a decentrally operating method is attended by advantages with regard to the data traffic to be handled by a comparison with centrally controlled methods in which the switching nodes transmit seizure data at periodic intervals to a central network processor which calculates therefrom requirements for determining the second path, and then transmits these back again to the switching node.

Nevertheless, even in the case of the first-mentioned known method, the volume of the data traffic to be handled in the network is substantial.

SUMMARY OF THE INVENTION

It is an object of the present invention to improve a method of the type mentioned at the beginning to the effect that the data traffic required in connection with determining the second path is reduced.

According to the method of the present invention for traffic routing in a communications network, a plurality of switching nodes is provided which are intermeshed such that a connection can be established between two neighboring switching nodes via a plurality of connecting paths so that if a direct path between an originating switching node in a neighboring destination switching node is not available, a second path leading via an intermediate switching node is determined so that data relating to achievability both of direct paths connecting this switching node to its neighboring nodes and of direct paths connecting the neighboring destination switching node to its respective neighboring nodes are made available in the originating switching node. Based on this data, selection is performed with respect to as high a probability as possible of successful switching via the second path. The data periodically updated in the switching nodes and relating to the direct paths connected to them are respectively combined in a node-specific priority list, ordered in terms of degrees of achievability. Each switching node sends its own priority list to all its neighboring nodes so that node-specific priority lists of all the neighboring nodes are available in each switching node. For identifying a second path, the common switching node to which direct routes lead whose obtainability data promise a successful call setup with at least great probability is selected as an intermediate switching node in the originating switching node. The common switching node is selected by comparison of the priority list pertaining to the originating switching node to the priority list pertaining to the neighboring destination switching node. Upon successful switching, the second path is stored and, as long as the previous priority list continues to be valid, is used directly for a subsequent corresponding call request without a determination procedure.

Consequently, achievability data are not, as in the case of the first-mentioned known method, requested from the relevant destination switching node with reference to each establishment of a connection, but achievability data are held in the individual switching nodes for all the remaining switching nodes in the form of node-specific priority tables to which recourse is made when seeking a second path during establishment of a connection, with the result that data traffic between the switching nodes is normally performed only at times of priority list transmissions performed at relatively large intervals. Since, in addition, a second path once found is held firm during a determination period until a connection can no longer be established via it, the node-internal control data exchange is also of relatively low volume.

Also involved in embodiments of the invention are the type and calculation of the data used to identify the achievability of the direct paths. Furthermore, the data volume in the case of periodic data transmission between the switching nodes, as a result of which it is possible to choose between different degrees of dynamic loading in accordance with the network conditions, are involved in the invention.

An advantageous algorithm for evaluating priority lists of an originating switching node and of a destination switching node when determining a second path are also provided in accordance with the invention.

Also with the invention, under specific conditions which no longer allow orderly traffic handling to appear possible over a found second path, there is a deliberate departure from the periodic transmission of achievability data, with the result that even in these cases it is possible to find within the updating periods a second path via which switching is possible.

DESCRIPTION OF THE PREFERRED EMBODIMENTS

Figure 1:
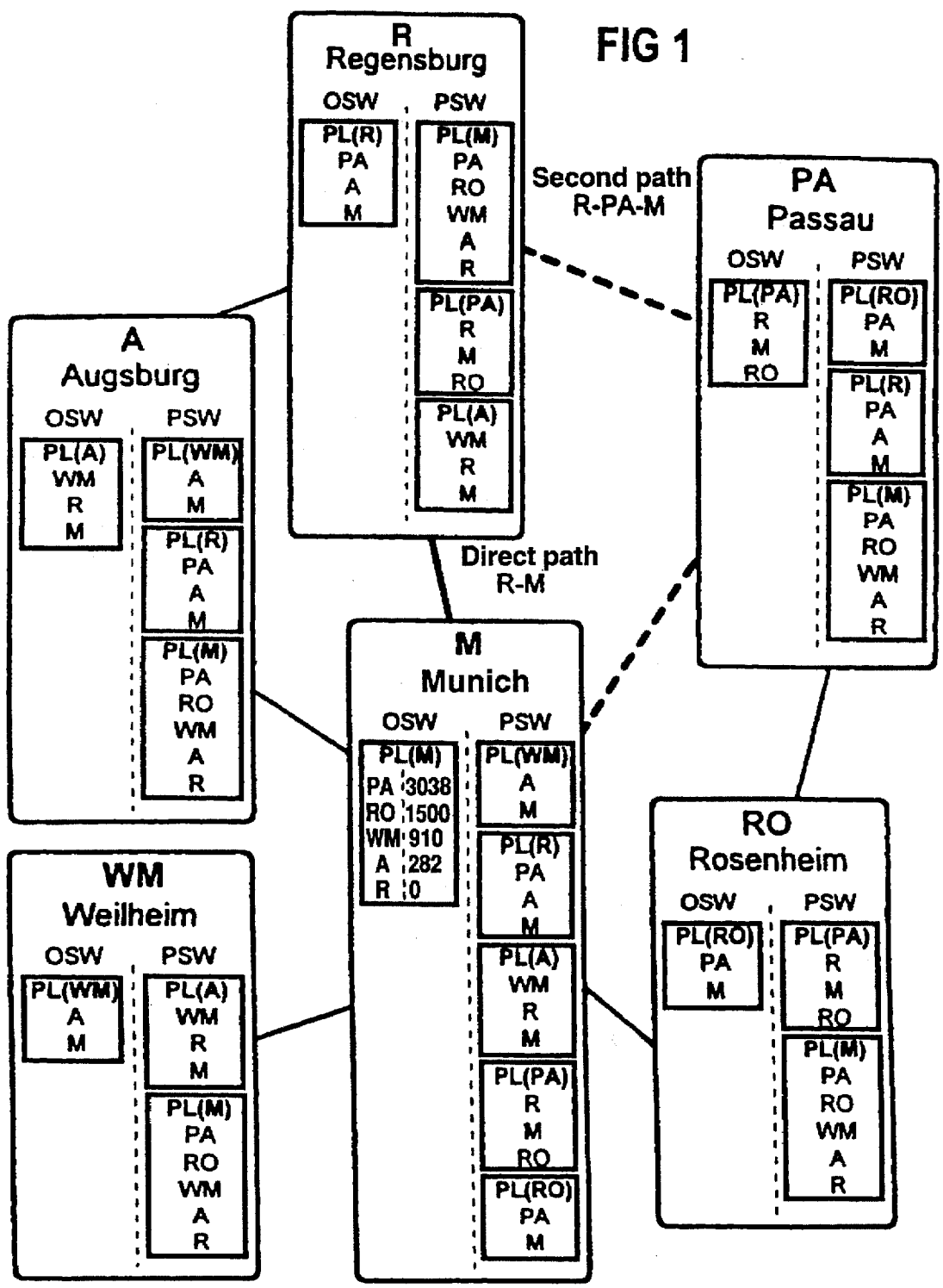
FIG. 1 shows an example of a communications network having six intermeshed switching nodes.

FIG. 1 shows, by way of example, a communications network having intermeshed switching nodes M for Munich, A for Augsburg, R for Regensburg, PA for Passau, RO for Rosenheim and WM for Weilheim.

Respectively represented inside the boxes symbolizing the individual switching nodes are a priority list OSW, an originating priority list, and a plurality of priority lists PSW which are priority lists relevant to destination switching nodes.

The originating priority lists contain data relating to direct paths via which the individual switching nodes are connected to their neighboring nodes. These data are ordered in terms of the degree of achievability of the direct paths. Thus, for example, in the originating priority list OSW, denoted by PL (A) for Augsburg, the identifiers WM, R and M are entered in this sequence in order to identify the direct paths to the switching nodes of Weilheim, Regensburg, and Munich.

Furthermore, in the switching node of Augsburg, the priority lists of the neighboring nodes of the switching node of Augsburg are available, that is to say the priority lists PL (WM) of Weilheim, PL (R) of Regensburg, and PL (M) of Munich. These switching nodes are connected to the switching node of Augsburg via a direct path, and come into consideration as destination switching nodes in the sense of the present method. The identifiers of the neighboring switching nodes which can be reached via a direct connection starting from the destination switching nodes are also contained in these priority lists, ordered in terms of the degree of achievability. Thus, the priority list PL (WM), available in the switching node of Augsburg, of the destination switching node of Weilheim shows in the first position the identifier A of the switching node of Augsburg, and in the second position the identifier M of the switching node of Munich, the second neighboring node of Weilheim. The priority list of PL (R) of the destination switching node of Regensburg contains the identifiers PA, A and M of Passau, Augsburg and Munich, and the priority list PL (M) of the destination switching node of Munich contains the identifiers PA, RO, WM, A and R of Passau, Rosenheim, Weilheim, Augsburg and Regensburg, in the enumerated sequence in each case.

Apart from the above-mentioned identifiers of neighboring nodes, the priority lists also contain a quality factor for the direct connection to these neighboring nodes. This is illustrated in FIG. 1 in the originating priority list from Munich wherein besides the identifiers for switching nodes, quality factors for the direct paths to the switching nodes contained in the list are also shown. These are the quality factors indicated as an example in the last line of the table provided below. Quality factors are not shown in the remaining priority lists, but are conceived in corresponding fashion. This quality factor is either calculated on the basis of fixed seizure conditions, or is allocated as a fictional quality factor in accordance with the sequence of, identification in the priority list. In the case of calculation from the fixed seizure conditions, the quality factor represents the product of the ratio of the square of the instantaneous number of free connecting channels to the total number of the connecting channels of a direct path, and of the ratio, valid in the updating period, of the number of the connections successfully handled via the direct path to the number of call attempts.

Represented below as an example are the calculation variables and quality factors of the priority list of the switching node of Munich, which has the identifiers R, PA, RO, WM and A for neighboring nodes which can be reached via direct connections. The factor RCA is multiplied in this case by 100, in order to produce whole numbers. As the table shows, with falling quality, the sequence PA, RO, WM, A and R of the neighboring node identifiers is produced for this priority list.

| Partner switching Node | R | PA | RO | WN | A |
| --- | --- | --- | --- | --- | --- |
| free trunks (NFT all | 0 | 35 | 23 | 14 | 11 |
| trunks (NAT) | 50 | 40 | 35 | 20 | 35 |
| (NFT★NFT)/NAT/ = RFA | 0 | 31 | 15 | 10 | 3 |
| calls completed (NCC) | 10 | 44 | 13 | 21 | 32 |
| call attempts (NCA) | 58 | 45 | 13 | 23 | 34 |
| NCC/NCA = RCA | 17 | 98 | 100 | 91 | 94 |
| Quality = RFA★RCA | 0 | 3038 | 1500 | 910 | 282 |

The originating priority lists are updated in the individual switching nodes at short intervals, for example at intervals of 10 s, from the information relating to the seizure state and the seizure attempts of the direct paths, the use of a direct path remaining out of consideration as a constituent of an alternative path. At intervals which are long by comparison therewith, for example 15 min, these priority lists are sent to the neighboring nodes respectively connected via a direct path, in order to form there the stock of the priority lists PSW of the destination switching nodes.

It can also be provided as an alternative to transmitting complete priority lists to neighboring nodes that only the computational principles for the quality factors or the partial results for calculating the quality factors are transmitted to the neighboring nodes, and calculation and classification in a priority list are respectively performed there.

In order to explain the method according to the invention further, a connection between the switching node of Regensburg as an originating switching node and the switching node of Munich as a destination switching node is considered below, it being assumed that the direct path which is normally used is not available. As FIG. 1 shows, second paths via Augsburg or via Passau come into consideration for such a connection.

Figure 2:
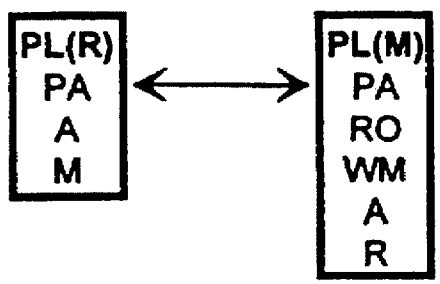
FIGS. 2–4 show priority lists, valid for various load situations, of an originating switching node and of a destination switching node of such a communications network.

In order to determine the suitable second path, as indicated in FIG. 2, the originating priority list for Regensburg PL (R) is now compared in the switching node of Regensburg with the destination switching priority list present there for Munich PL (M). In this case, a corresponding neighboring node identifier is sought, and then that neighboring node which is situated in a second path which promises the highest switching probability is selected as an intermediate switching node. In the example taken, this is the switching node of Passau, which is ranked in first place in both priority lists.

The found second path via Passau is now stored, and a connection is established via this intermediate switching node.

In the event of subsequent corresponding call requests, as long as the priority lists are still valid this second path is reused without the above-mentioned switching procedure running.

This is the case up to the periodic updating of the destination switching priority lists after, for example, 15 min. in each case.

Figure 3:
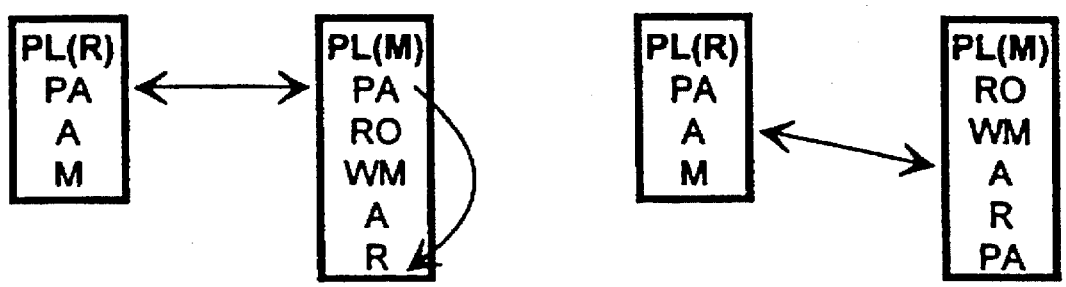

FIG. 3 likewise relates to the example of a connection between Regensburg as an originating switching node and Munich as a destination switching node, it being assumed, however, that a second path via Passau has already been determined. If in the case of the establishment of a connection via this second path it is determined in the switching node of Regensburg that the direct connection between Regensburg and Passau is not available, in accordance with a further embodiment of the invention the identifier in the originating priority list of Regensburg for the neighboring node of Passau is put in the last position and the quality factor is set to the value 0, which corresponds to the lowest possible quality, instead of the calculated value valid till now. The previously stored second path, leading via Passau, is erased. Using this amended priority list, a comparison of originating and destination priority lists is then undertaken anew and leads, as indicated in the right-hand part of the FIG., to the switching node of Augsburg as an intermediate switching node.

Figure 4:
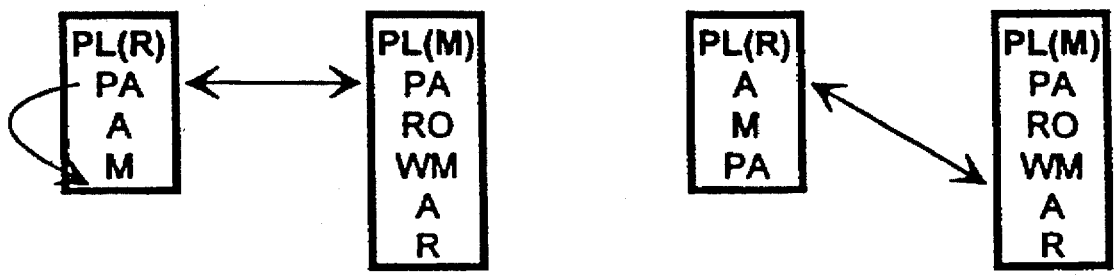

FIG. 4 likewise relates to a connection between the switching nodes of Regensburg and Munich and the precondition of a second path, already present, via the intermediate switching node of Passau. However, it is also assumed here that the link from the switching node of Passau to the switching node of Munich of the second path turns out to be not available in the case of the establishment of a connection, this being signalled by the intermediate switching node of Passau to the originating switching node of Regensburg (CRANK BACK). Thereafter, the identifier for Passau is moved from the previous first position to the last position in the priority list of the switching node of Munich, present in the switching node of Regensburg, and the possible value 0 is entered as an imaginary quality factor. As in the preceding example, the second path leading via the intermediate switching node of Passau is erased. Using the corrected priority list for Munich, the priority list comparison is then repeated, which, as indicated in the right-hand part of the FIG., leads to the switching node of Augsburg as the intermediate switching node.

If such a priority list reordering has repeatedly taken place a prescribed number of times within the updating period of 15 min, the originating switching node requests a new priority list from the relevant neighboring node out of turn.

An out of turn request for a new priority list is also performed when a second path is determined whose link connecting the intermediate switching node to the neighboring destination switching node has a quality below a fixed minimum value.

In the above-mentioned comparison of the priority lists of an originating switching node and of a destination switching node, the respectively smaller priority list is traversed in an outer loop, and the respectively larger priority list is traversed in an inner loop, until a corresponding switching node identifier is found for the first time. This identifier and the quality, arising from the quality factors of the links, of the corresponding second path are stored. If during the further traversal of the lists a corresponding switching node identifier is found anew and the corresponding second path is of better quality than the previously found second path, the identifier and quality of this second path are stored. That second path whose values are stored in this way at the end of the traversal of the lists is then used as the valid second path for switching.

Figure 5:
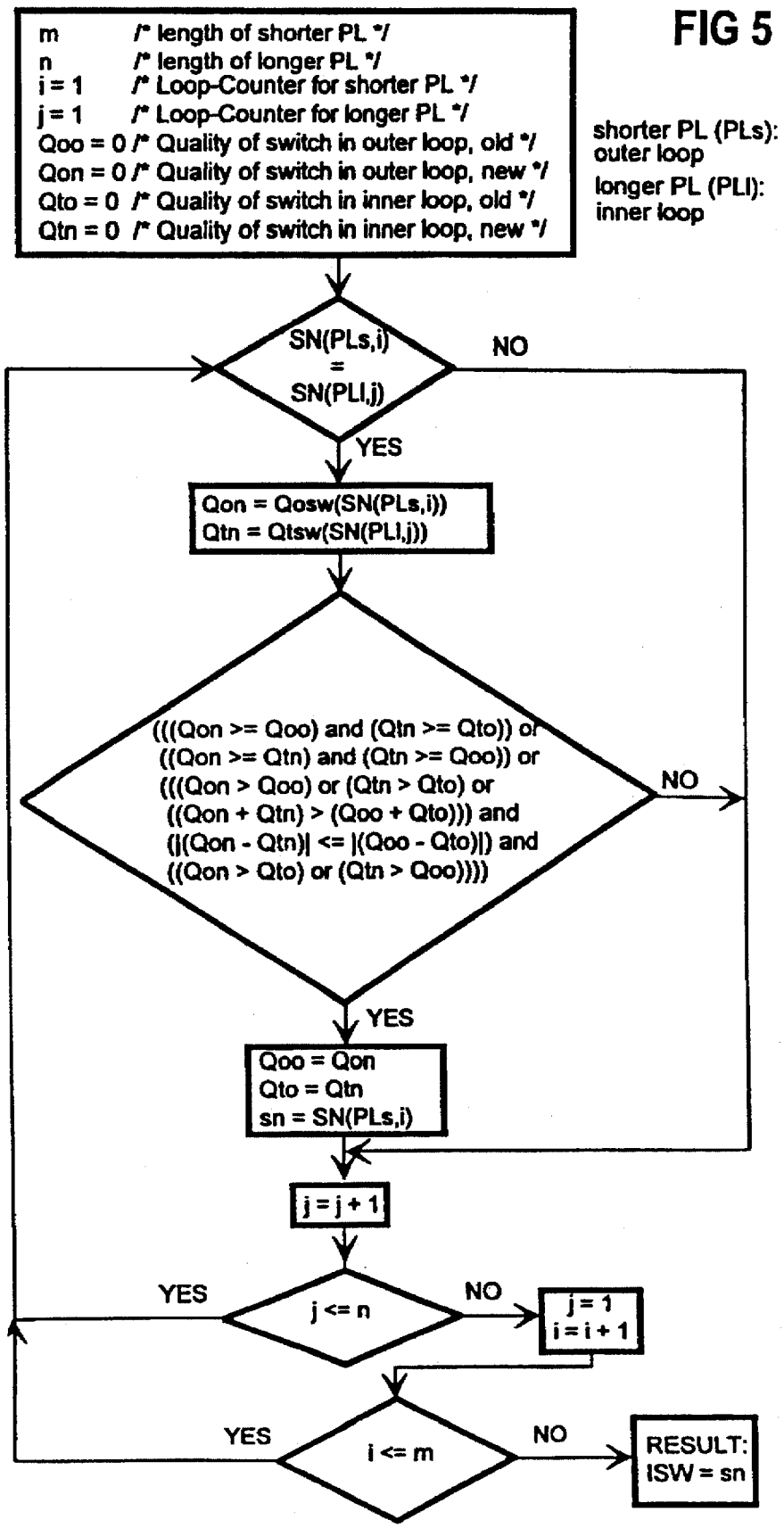
FIG. 5 shows a flow diagram to illustrate the algorithm according to the invention for the joint evaluation of an originating and destination priority list.

This procedure is demonstrated again in the flow diagram in accordance with FIG. 5. If, for example, the shorter priority list PL (R) represented in the right-hand part of FIG. 4 for Rosenheim and the priority list PL (M) for Munich, which is longer by comparison, are to be compared, the first step would be to compare with the first position PA for Passau of the shorter list all the positions of the list for Munich, until the corresponding identifier for Passau is found. This identifier for Passau and the quality factors for the links of Regensburg-Passau and Munich-Passau are then stored as quality factors Qon and Qtn. Upon continuation of the comparison, the second position A of the priority list PL (R) is compared with all the positions of the list PL (M), A for Augsburg being found as a corresponding node identifier. In accordance with the assumptions made for FIG. 4, the second path leading via Augsburg is of better quality than that leading via Passau, with the result that the values for this second path are replaced by the values for the second path via Augsburg. Since in the last part of the comparison, in which the last position M of the priority list PL (R) is compared with all the positions of the priority list PL (M), no more corresponding node identifier is found, the second path leading via Augsburg is the valid path via which the switching is then performed.

In FIG. 5, the following symbols have the following meaning:

SN=switch node number
PL=priority list
PLs=shorter priority list
PLl=longer priority list
Qosw=quality of originating switch
Qtsw=quality of terminating switch
ISW=intermediate switch.

In a departure from the described procedure, it is also possible alternatively to proceed in such a way that the priority lists are not completely searched through in every case, but the second path initially found is promoted to the valid second path when it is of a quality higher than a fixed minimum value. In this case, it is thus possible to dispense with determining the optimum second path.

If the object in a communications network is to establish a connection between switching nodes between which no direct path exists, the method according to the invention is applied repeatedly to subregions in which relevant switching nodes are directly neighboring. When given the communications network represented in FIG. 1, for example, a connection is to be set up between the switching node of Augsburg (A) and the switching node of Rosenheim (RO), and when it is established that the first path leads via Munich (M), the method according to the invention would be applied to search for a second path for one or for both of these direct paths depending on which of the direct paths of Augsburg-Munich and Munich-Rosenheim is not available.

Although various minor changes and modifications might be proposed by those skilled in the art, it will be understood that our wish is to include within the claims of the patent warranted hereon all such changes and modifications as reasonably come within our contribution to the art.

We claim as my invention:

1. A method for traffic routing in a communications network having a plurality of switching nodes interconnected such that a connection can be established between two neighboring switching nodes via a plurality of connecting paths so that if a direct path between an originating switching node and a neighboring destination switching node is not available, a second path leading via an intermediate switching node can be determined, comprising the steps of:

providing in the originating switching node data relating to both achievability of direct paths connecting the originating switching node to its neighboring nodes, and achievability of direct paths connecting the neighboring destination switching nodes to their respective neighboring nodes, this being achieved by data periodically updated in the switching nodes and relating to the direct paths connected to these switching nodes being combined in node-specific priority lists which are ordered in terms of degree of achievability, and wherein each switching node sends its own priority list to all of its neighboring nodes so that node-specific priority lists of all the neighboring nodes are available in each switching node;

for identifying a second path which has as high a probability as possible of successful switching, the priority list of the originating node is compared with the priority list of the neighboring destination node, and the neighboring node whose direct paths to the originating and destination nodes promises the highest switching probability is selected as said intermediate switching node for said second path; and upon successful switching, storing the second path and, as long as the previous priority lists continue to be valid, using the second path directly for a subsequent corresponding call request without a determination procedure.

2. The method according to claim 1 including the steps of recording identifiers of the switching nodes to which a connection exists via the direct paths and a quality factor calculated based on established seizure conditions in the priority lists as data for achievability of the direct paths.

3. The method according to claim 2 including the steps of calculating the quality factor of a direct path as a product of a ratio of a square of an instantaneous number of free connecting channels to a total number of the connecting channels of the direct path, and a ratio, valid in the updating period, of a number of the connections successfully handled via the direct path to a number of call attempts.

4. The method according to claim 3 wherein the switching nodes send to their neighboring nodes only intermediate variables or only original variables for calculating quality factors, and wherein calculation of the corresponding quality factor is performed in a receiving switching node.

5. The method according to claim 1 wherein identifiers of the switching nodes to which a connection exists via the direct paths, and a fictional quality factor corresponding to an arrangement sequence of the identifiers, are recorded in the priority lists as data for the achievability of the direct paths.

6. The method according to claim 2 wherein when comparing the priority lists, one priority list is traversed in an outer loop and another priority list is traversed in an inner loop until a corresponding switching node identifier is found for a first time, and wherein the identifier is stored together with the quality resulting from the quality factors of the links of the corresponding second path, then values are replaced either in each case or only when a minimum value has not been reached for the quality, and when the traversal of the priority lists is conducted further, a further corresponding switching node identifier is found and the corresponding second path has a higher quality than that found so far, and the second path whose values are stored in this way at the end of the traversal of the lists is used as the valid second path for switching.

7. The method according to claim 1 wherein when switching fails via a directly used stored second path, said second path is erased and, depending on which link of the second path is blocked, in a data stock of the originating switching node either in the dedicated priority list or in the priority list relevant to the destination switching node an entry denoting the direct path leading to the intermediate switching node of this second path is set to a last position, a fictional quality factor identifying a lowest possible rank is entered as a quality factor, and the priority list as thus amended is used as a basis for a subsequent determination of the second path.

8. The method according to claim 7 wherein when determining a second path whose link connecting the intermediate switching node to the neighboring destination switching node has a quality below a fixed minimum value, or if the priority list present in the originating switching node of this destination switching node reordering has taken place to a prescribed number, a new priority list is requested by the destination switching node before expiration of a transmission period.

* * * * *